United States Patent

Foo et al.

[11] Patent Number: 5,746,444
[45] Date of Patent: May 5, 1998

[54] METHOD AND APPARATUS FOR SINGLE POINT SENSING OF FRONT AND SIDE IMPACT CRASH CONDITIONS

[75] Inventors: Chek-Peng Foo, Ann Arbor, Mich.; James Edward Bormann, La Porte, Ind.

[73] Assignee: TRW Inc., Lyndhurst, Ohio

[21] Appl. No.: 720,353

[22] Filed: Sep. 27, 1996

[51] Int. Cl.$^6$ .................................................. B60R 21/32
[52] U.S. Cl. .......................... 280/735; 180/282; 340/436; 364/424.055
[58] Field of Search .................................. 180/282, 274; 280/735, 734, 730.2, 730.1; 307/10.1; 340/436, 438; 364/424.055, 424.056

[56] References Cited

U.S. PATENT DOCUMENTS

| | | | |
|---|---|---|---|
| 3,720,426 | 3/1973 | Johnston | 280/735 |
| 5,083,276 | 1/1992 | Okano et al. | 280/735 |
| 5,172,790 | 12/1992 | Ishikawa et al. | 280/730.2 |
| 5,202,831 | 4/1993 | Blackburn et al. | 180/282 |
| 5,208,484 | 5/1993 | Okano et al. | 307/10.1 |
| 5,234,228 | 8/1993 | Morota et al. | 280/734 |
| 5,322,323 | 6/1994 | Ohno et al. | 280/730.2 |
| 5,357,141 | 10/1994 | Nitschke et al. | 307/10.1 |
| 5,363,303 | 11/1994 | Kaneko et al. | 180/282 |
| 5,449,198 | 9/1995 | Jeenicke et al. | 280/735 |
| 5,483,447 | 1/1996 | Jeenicke et al. | 364/424.055 |
| 5,484,166 | 1/1996 | Mazur et al. | 280/735 |
| 5,513,109 | 4/1996 | Fujishima | 364/424.055 |
| 5,566,974 | 10/1996 | Mazur et al. | 280/730.2 |
| 5,609,358 | 3/1997 | Iyoda et al. | 180/282 |

FOREIGN PATENT DOCUMENTS 0536624  4/1993  European Pat. Off. .

OTHER PUBLICATIONS

U.S. Patent Application Ser. No. 08/589,846 to Foo et al., filed Jan. 22, 1996 for "Method and Apparatus for Sensing Impact Crash Conditions with Safing Function".

U.S. Patent Application Ser. No. 08/490,715 to Foo et al., filed Jun. 15, 1995 for "Method and Apparatus for Providing a Safing Function for Side Impact Crash Sensing Systems".

*Primary Examiner*—Peter C. English
*Attorney, Agent, or Firm*—Tarolli, Sundheim, Covell, Tummino & Szabo

[57] ABSTRACT

An apparatus (20) for controlling actuation of front restraints (12, 14) and side restraints (16, 18). The apparatus includes sideways crash sensors (42, 44) and a frontal crash sensor (40) all mounted at a single central location. Sideways crash acceleration is derived from one sideways sensors (42) and sideways crash velocity is derived from another sideways sensor (44). The side restraints are controlled using the sideways crash acceleration and sideways crash velocity for discrimination or safing purposes. Actuation of the side restraints is disabled for a time period if a frontal crash condition is sensed.

12 Claims, 3 Drawing Sheets

5,746,444

METHOD AND APPARATUS FOR SINGLE POINT SENSING OF FRONT AND SIDE IMPACT CRASH CONDITIONS

TECHNICAL FIELD

The present invention is directed to an occupant restraint system in a vehicle and specifically to a method and apparatus for single point sensing of front and side impact crash conditions.

BACKGROUND OF THE INVENTION

Systems for restraining vehicle occupants during front and side impacts are known in the art. A typical front restraint system includes an air bag mounted in the vehicle steering wheel (driver's side) or dash (passenger's side). A typical side restraint system includes a side air bag assembly mounted in either a side structure of the vehicle, such as a door, or in the vehicle seat. Preferably, each vehicle side seat location has an associated side air bag assembly. Restraint systems further include a controller connected to the front and side air bag assemblies. The controller controls actuation of the air bag assemblies in response to signals provided from crash sensors. The crash sensors are mounted at several different locations in the vehicle.

Typically, each side air bag assembly has an associated crash sensor mounted in an associated side assembly of the vehicle, e.g., the door associated with that side air bag. A typical crash sensor for a side restraint system includes a "crush sensor," e.g., a contact switch, which detects the physical crushing of the associated vehicle door during a side impact. U.S. Pat. No. 5,566,974 to Mazur et al. entitled for "METHOD AND APPARATUS FOR RESTRAINING AN OCCUPANT DURING A SIDE IMPACT" discloses a side restraint system that includes an accelerometer for sensing the occurrence of a sideways crash event. In Mazur et al., a controller monitors the side accelerometer and determines if a crash event is occurring in response to the accelerometer output signal.

U.S. patent application Ser. No. 08/589,846 to Foo et al., filed Jan. 22, 1996, for "METHOD AND APPARATUS FOR SENSING IMPACT CRASH CONDITIONS WITH SAFING FUNCTION" and U.S. patent application Ser. No. 08/490,715 to Foo et al., filed Jun. 15, 1995, for "METHOD AND APPARATUS FOR PROVIDING A SAFING FUNCTION FOR SIDE IMPACT CRASH SENSING SYSTEMS" both describe side impact detection arrangements which use two side accelerometers for side impact detection. One accelerometer is used for discrimination purposes and the other is used for safing purposes. The accelerometers are mounted at the location of their associated side restraint, e.g., positioned at the side door location, with their axis of sensitivity oriented transverse to the front-to-rear axis of the vehicle.

The Foo et al. '846 patent application also discloses use of a third transverse mounted accelerometer at the vehicle transmission tunnel. The third accelerometer (the "tunnel accelerometer") is use in combination with a selected one of the side mounted accelerometers for crash discrimination purposes.

Front restraint systems typically include two crash sensors. One of the crash sensors functions as a "primary" or "discrimination" crash sensor. The other crash sensor functions as a "safing" crash sensor. Actuation of the front restraint system requires detection of a deployment crash condition by both the primary crash sensor and the safing crash sensor.

SUMMARY OF THE INVENTION

The method and apparatus of the present invention provide front and plural sideways crash sensors mounted on a single assembly and positioned at a central location of the vehicle. A controller monitors all of the crash sensors and controls plural actuatable restraints in response thereto. A sideways acceleration value is determined from one of the sideways crash sensors. A sideways velocity value is determined from the other of the sideways crash sensors. The determined values from the sideways crash sensors are used for discriminating and safing purposes. If a frontal crash event is detected using the frontal crash sensor, the side restraint system is disabled for a predetermined time period.

In accordance with one aspect of the present invention, an apparatus for controlling first and second actuatable side restraints in a vehicle comprises first acceleration sensing means having an axis of sensitivity and mounted to the vehicle at a location. The acceleration sensing means provides a first crash signal upon the occurrence of a sideways crash acceleration of the vehicle. Second acceleration sensing means is provided having an axis of sensitivity and mounted at the location for providing a second crash signal upon the occurrence of sideways crash acceleration of the vehicle. The apparatus further includes means for determining a sideways crash acceleration value in response to the first crash signal and means for determining a sideways crash velocity value in response to the second crash signal. Means are provided for actuating the first actuatable side restraint when (i) the determined crash acceleration value is greater than an acceleration discrimination threshold value and the determined crash velocity value is greater than a velocity safing threshold value or (ii) the determined crash acceleration value is greater than an acceleration safing threshold value and the determined crash velocity value is greater than a velocity discrimination threshold value.

In accordance with another aspect of the present invention, an apparatus is provided for controlling front and side restraints in a vehicle. The apparatus includes first acceleration sensing means having an axis of sensitivity mounted to the vehicle at a location for providing a first crash signal upon the occurrence of a sideways crash acceleration of the vehicle. The apparatus further includes second acceleration sensing means having an axis of sensitivity mounted at the location for providing a second crash signal upon the occurrence of the sideways crash acceleration of the vehicle. Third acceleration sensing means are provided having an axis of sensitivity and mounted to the vehicle at the location for providing a third crash signal upon the occurrence of a front-to-rear crash acceleration of the vehicle. Means controls actuation of the side restraints in response to the first and second crash signals. The apparatus further includes means for controlling actuation of the front restraint in response to the third crash signal and means for disabling actuation of the side restraints when the third crash signal indicates a frontal crash is occurring.

In accordance with another aspect of the present invention, an apparatus for controlling front and side restraints in a vehicle comprises first acceleration sensing means having an axis of sensitivity and mounted to the vehicle at a location for providing a first crash signal upon the occurrence of a sideways crash acceleration of the vehicle, and second acceleration sensing means having an axis of sensitivity and mounted at the location for providing a second crash signal upon the occurrence of a frontal crash acceleration of the vehicle. Means are provided for determining a sideways crash value in response to the first crash signal. The apparatus further includes means for actuating the side restraint in response to the first crash signal and means for actuating the front restraint in response to the second crash signal. Means disables actuation of the side restraint in response to the second crash signal.

In accordance with another embodiment of the present invention, a method is provided for controlling first and second actuatable side restraints in a vehicle. The method comprises the steps of mounting a first accelerometer having an axis of sensitivity to the vehicle at a location so as to provide a first crash signal upon the occurrence of a sideways crash acceleration of the vehicle and mounting a second accelerometer having an axis of sensitivity at the location so as to provide a second crash signal upon the occurrence of the sideways crash acceleration of the vehicle. The method further includes the steps of determining a sideways crash acceleration value in response to the first crash signal, and determining a sideways crash velocity value in response to the second crash signal. The first actuatable side restraint is actuated when (i) the determined crash acceleration value is greater than an acceleration discrimination threshold value and the determined crash velocity value is greater than a velocity safing threshold value or (ii) the determined crash acceleration value is greater than an acceleration safing threshold value and the determined crash velocity value is greater than a velocity discrimination threshold value.

In accordance with another aspect of the present invention, a method is provided for controlling front and side restraints in a vehicle. The method comprises the steps of mounting a first accelerometer having an axis of sensitivity to the vehicle at a location so as to provide a first crash signal upon the occurrence of a sideways crash acceleration of the vehicle, and mounting a second accelerometer having an axis of sensitivity at the location so as to provide a second crash signal upon the occurrence of a frontal crash acceleration of the vehicle. A sideways crash value is determined in response to the first crash signal and the side restraint is actuated in response to the first crash signal. The front restraint is actuated in response to the second crash signal. The method disables actuation of the side restraint in response to the second crash signal.

In accordance with another aspect of the present invention, a method is provided for controlling front and side actuatable restraints in a vehicle. The method comprises the steps of mounting a first accelerometer having an axis of sensitivity to the vehicle at a location so as to provide a first crash signal upon the occurrence of a sideways crash acceleration of the vehicle, mounting a second accelerometer having an axis of sensitivity at the location so as to provide a second crash signal upon the occurrence of the sideways crash acceleration of the vehicle, and mounting a third accelerometer having an axis of sensitivity to the vehicle at the location so as to provide a third crash signal upon the occurrence of a front-to-rear crash acceleration of the vehicle. Actuation of the side restraints is controlled in response to the first and second crash signals. Actuation of the front restraint is controlled in response to the third crash signal. In accordance with the method, actuation of the side restraints is disabled when the third crash signal indicates a frontal crash is occurring.

BRIEF DESCRIPTION OF THE DRAWINGS

Further features and advantages of the present invention will become apparent to those skilled in the art to which the present invention relates from reading the following detailed description with reference to the accompanying drawings, in which.

DESCRIPTION OF PREFERRED EMBODIMENTS

Figure 1:
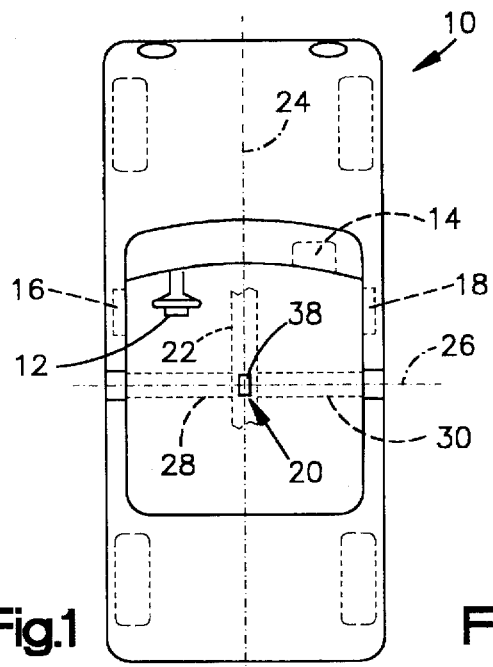
FIG. 1 is a schematic illustration of a vehicle having front and side restraint systems with a sensor mounting arrangement in accordance with one embodiment of the present invention.

Referring to FIG. 1, a vehicle 10 includes front actuatable restraints, i.e., air bag assemblies 12, 14, and side actuatable restraints, i.e., air bag assemblies 16, 18. A controller/crash sensor assembly 20 is centrally located in the vehicle 10. Preferably, the assembly 20 is secured at the transmission tunnel 22 and aligned with a vehicle front/aft central axis 24 and a side-to-side axis 26 that runs through the center of the vehicle's cross members 28, 30. Although other locations for mounting the assembly 20 are contemplated, this central location has been found to provide good communication of crash effects to the assembly 20 and thereby permit discrimination of crash events.

Figure 2:
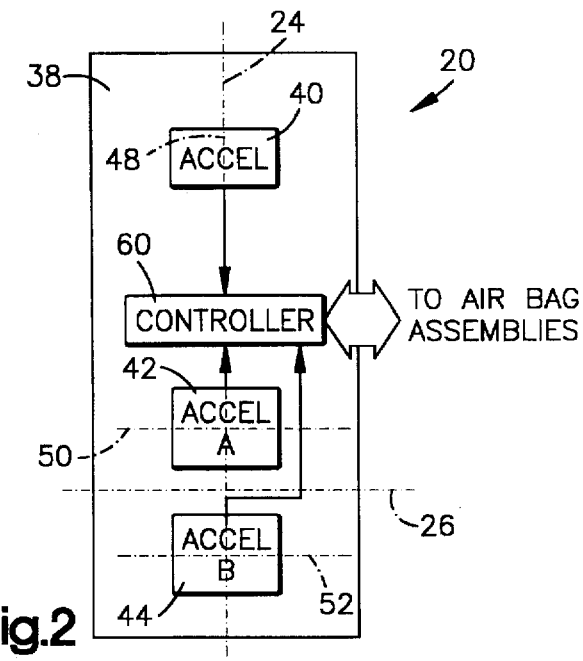
FIG. 2 is an enlarged view of the sensor mounting arrangement shown in FIG. 1.

Referring to FIG. 2, the controller /crash sensor assembly 20 includes a mounting board 38. A frontal crash sensor 40 and two sideways crash sensors 42, 44 are mounted to the mounting board 38. Each of the crash sensors 40, 42, and 44 are accelerometers having an associated axis of sensitivity. Each of the accelerometers has an electrical characteristic that varies as a function of a crash acceleration component the accelerometer experiences along its axis of sensitivity. Crash sensor 40 has its axis of sensitivity 48 preferably aligned with the central axis 24 of the vehicle. If the vehicle is subject to a frontal crash condition, a positive electrical signal will be output from accelerometer 40. If the vehicle is subject to a rearward crash condition, a negative electrical signal will be output from accelerometer 40.

The first sideways crash accelerometer 42 has an axis of sensitivity 50 aligned so as to be parallel with the axis 26 of the vehicle's cross members 28, 30. The second sideways crash accelerometer 44 has an axis of sensitivity 52 aligned so as to be parallel with the axis 26. Alternatively, the sensors 42, 44 could be mounted on the board 38 so as to be coaxial with axis 26. Preferably, the accelerometer 42 is oriented so that a crash into the driver's side of the vehicle will result in a positive electrical signal and a crash into the passenger's side of the vehicle will result in a negative electrical signal. Preferably, the accelerometer 44 is oriented so that a crash into the driver's side of the vehicle will result in a negative electrical signal and a crash into the passenger's side of the vehicle will result in a positive electrical signal. For simplicity in logic processing, the sign on one of the accelerometers, e.g., 44, is inverted so that both accelerometers appear to provide positive signals for crashes into the driver's door and negative signals for crashes into the passenger's door. Further processing discussions herein assume the same signs for same side crash events.

Each of the accelerometers 40, 42, 44 are electrically connected to a controller 60. The controller 60 is preferably a microcomputer programmed to execute a desired control process in accordance with the present invention. Each of the air bag assemblies 12, 14, 16, and 18 are also connected to the controller 60 through appropriate drive circuitry (not shown) well known in the art. Each of the air bag assemblies includes a squib (not shown) operatively connected to a gas generating material or a source of pressurized fluid (not shown) which is, in turn, coupled to an air bag, as is well known in the art. Ignition of a squib by a command signal from the controller 60 through its associated drive circuitry results in inflation of the associated air bag.

Figure 3:
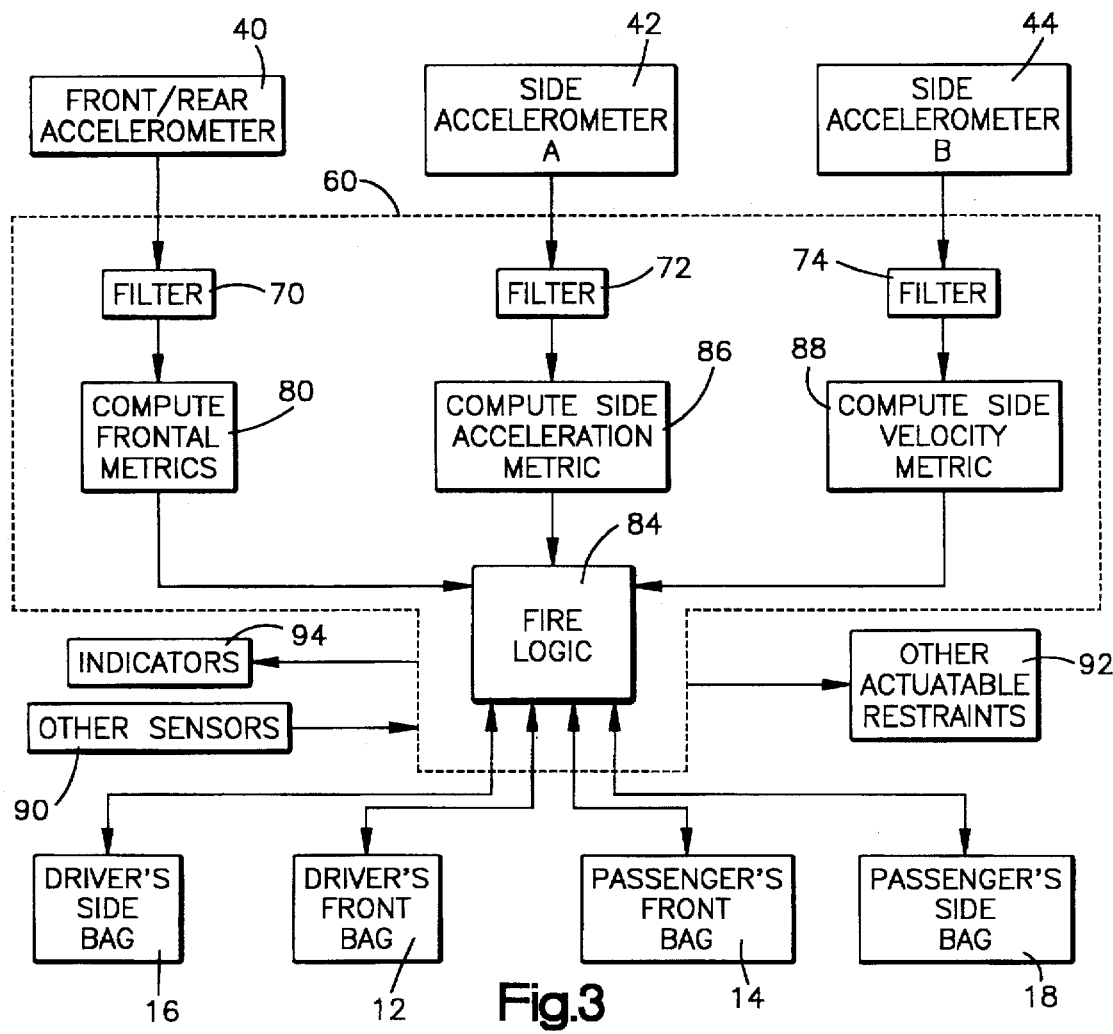
FIG. 3 is schematic functional block diagram showing the control arrangement in accordance with the present invention.

Referring to FIG. 3, functions performed by the controller 60 are shown in functional block diagram form. In the microcomputer embodiment of the present invention, those skilled in the art will appreciate that the depicted functions are carried out internally within the microcomputer. Alternatively, discrete circuitry could be used to achieve the same functions.

The signal from the frontal accelerometer 40 is filtered by a filtering function 70 of controller 60. Similarly, the signals from the accelerometers 42, 44 are filtered by filter functions 72, 74 of controller 60, respectively. These filtering functions 70, 72, 74 remove frequency components from their associated acceleration signals that are not useful in discriminating a crash event. The purpose of crash discrimination is to identify a crash event as either a deployment crash event or a non-deployment crash event.

The controller 60 computes a frontal crash metric value from the filtered frontal acceleration signal from accelerometer 40 shown as the compute frontal metric function 80 in FIG. 3. Any one or more of several known crash metrics may be used such as crash acceleration, average crash acceleration, crash velocity, crash displacement, jerk, ... etc. These metrics can be individually used or used in combination for discrimination purposes. Preferably, the frontal metric is as described in U.S. Pat. No. 5,587,906 entitled "Method and Apparatus for Sensing a Vehicle Crash Condition Using Velocity Enhanced Acceleration Crash Metrics" to McIver et al. which is hereby fully incorporated herein by reference. One metric value that is determined for further discrimination processing in accordance with the present invention is frontal crash velocity determined through integration of the acceleration signal. This frontal crash velocity metric value is used for control of the side restraints in a manner described below. At least one of the determined frontal metric values is compared against a corresponding threshold by firing logic 84 of controller 60 to determine whether or not to actuate the front air bags 12, 14. The firing logic 84 may compare the determined metric value against a fixed or variable threshold value, e.g., a threshold that varies as a function of acceleration, velocity or displacement. If the determined metric value exceeds its associated threshold value, the air bags are deployed.

The controller 60 computes, in function 86, a sideways acceleration based metric value by calculating a moving average of the sideways acceleration signal provided by sideways accelerometer 42. The controller 60 computes, in function 88, a sideways velocity based metric value by integrating the sideways acceleration signal provided by the sideways accelerometer 44. The determined sideways acceleration value and sideways velocity value are used by firing logic 84 to determine if either or both of side air bags 16, 18 should be deployed.

With regard to the deployment of the side air bags 16, 18, controller 60 compares each of the two metrics against associated discriminating and safing thresholds. Thus, the acceleration metric is compared against an associated acceleration discriminating threshold and an associated acceleration safing threshold, and the velocity metric is compared against an associated velocity discriminating threshold and an associated velocity safing threshold. The discriminating threshold for a metric will normally be higher (greater in magnitude) than the safing threshold for the same metric.

In accordance with the present invention, a side impact air bag will be deployed whenever one of the metrics (sideways velocity or sideways acceleration) is above its associated discrimination threshold at the same time that the other metric (sideways acceleration or sideways velocity) is above its associated safing threshold. For example, the side impact air bag will be deployed when the sideways velocity metric is above the discrimination threshold at the same time that the sideways acceleration metric is above the safing threshold.

Whether the driver's air bag or passenger's air bag is deployed will depend upon the polarities of the metric signals. As stated previously, the sideways accelerometers 42 and 44 have their signals processed (signs inverted on one) so that an impact on the driver's side of the vehicle will result in positive acceleration values for both. Thus, an impact on the driver's side is indicated when the metrics are above the associated thresholds. Impacts on the passenger side of the vehicle will result in negative acceleration values for both. Thus, an impact on the passenger's side of the vehicle is indicated when both metrics are lower than associated negative thresholds. If the accelerometers 42 and 44 have bi-directionally symmetrical responses, then the associated negative thresholds will simply be the additive inverses of the various thresholds.

In accordance with the present invention, both sideways discrimination determination and the sideways safing determination must agree that a deployment crash event is occurring before the appropriate side air bag will be deployed. If both the discrimination and safing function agree that a deployment crash event is occurring into the driver's door, the air bag 16 is deployed. If both the discrimination and safing function agree that a deployment crash event is occurring into the passenger's door, the air bag 18 is deployed. If the controller 60 determines that a frontal crash event is occurring, in accordance with the present invention, the controller 60 prevents deployment of the side restraints 16, 18 for a predetermined time period.

The vehicle's occupant restraint system may further include other sensors 90 operatively coupled to the controller 60. These sensors 90 may include occupant position sensors, weight sensors, etc. Control of the air bags, 12, 14, 16, and 18 can be additionally further controlled in response to the signals received from these other sensors 90. Control of an actuatable restraint in response to position and weight of an occupant is known in the art. Also, other actuatable occupant restraints 92 can be connected to the controller 60 such as seat belt pretensioners, knee blockers, etc. Such other actuatable restraints would be controlled by controller 60 in response to sensor inputs including sensors 40, 42, 44. The controller 60 is connected to instrument panel indicators 94 for providing indications to the vehicle occupants of the status of the restraint system. It is well known in the actuatable restraint art to include diagnostic testing of the restraint system and activation of a warning indicator should a system error be detected.

Figure 4A:
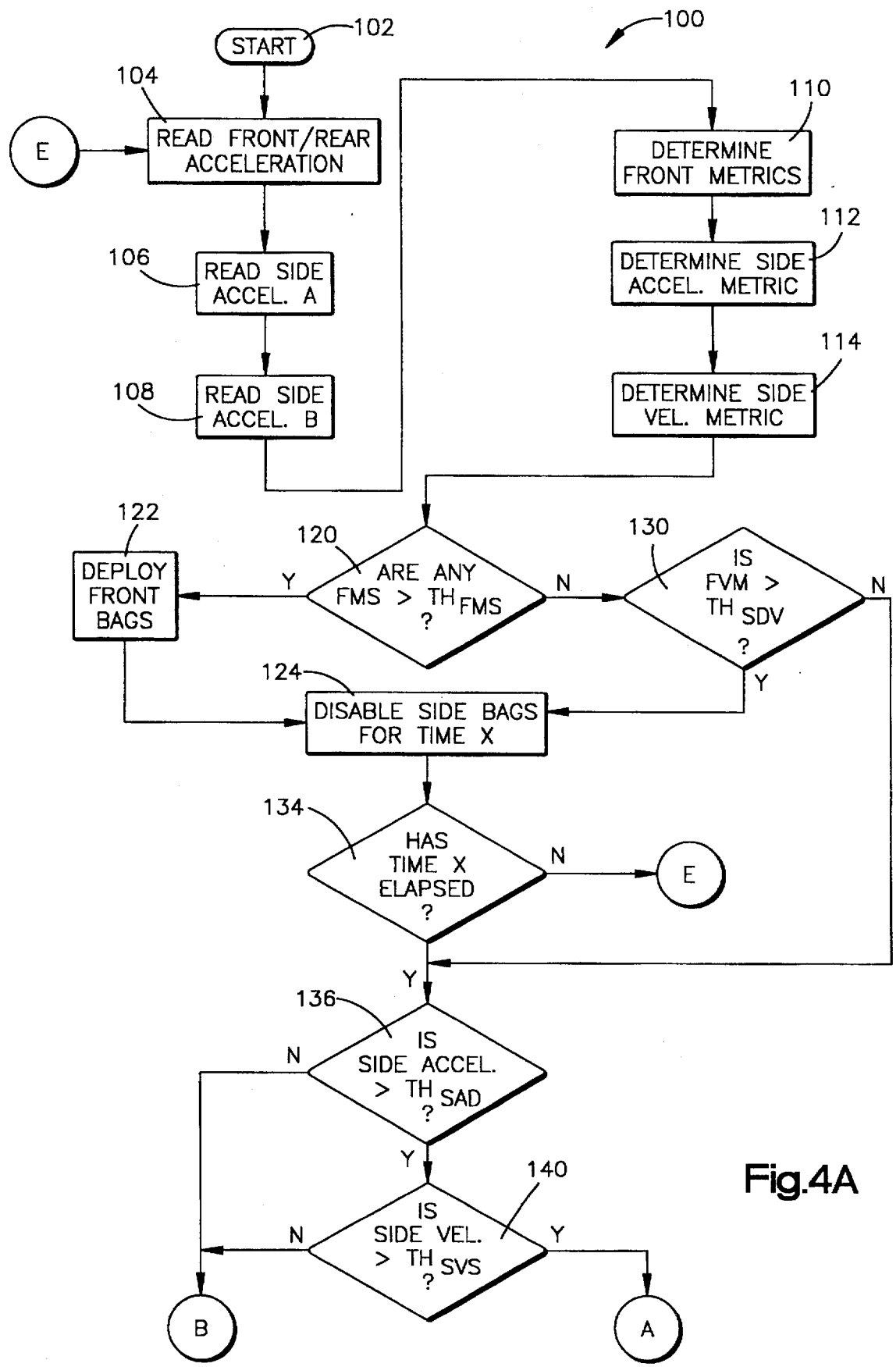
FIGS. 4A–4C are flow-charts of the control process, in accordance with the present invention, executed by the control module of FIG. 2.
Figure 4C:
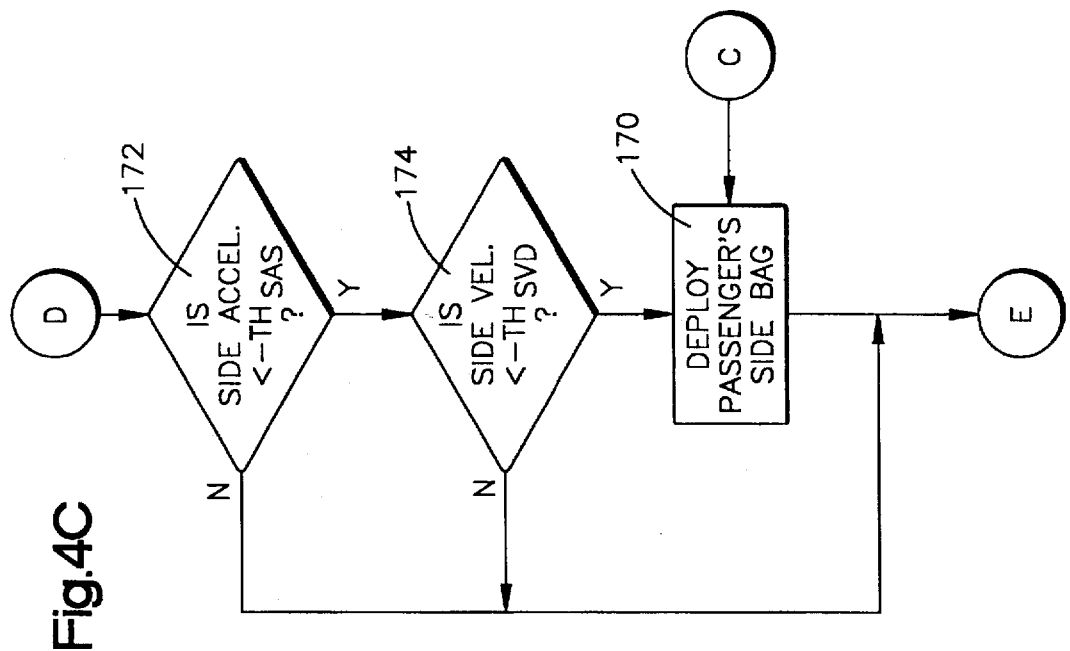
Figure 4B:
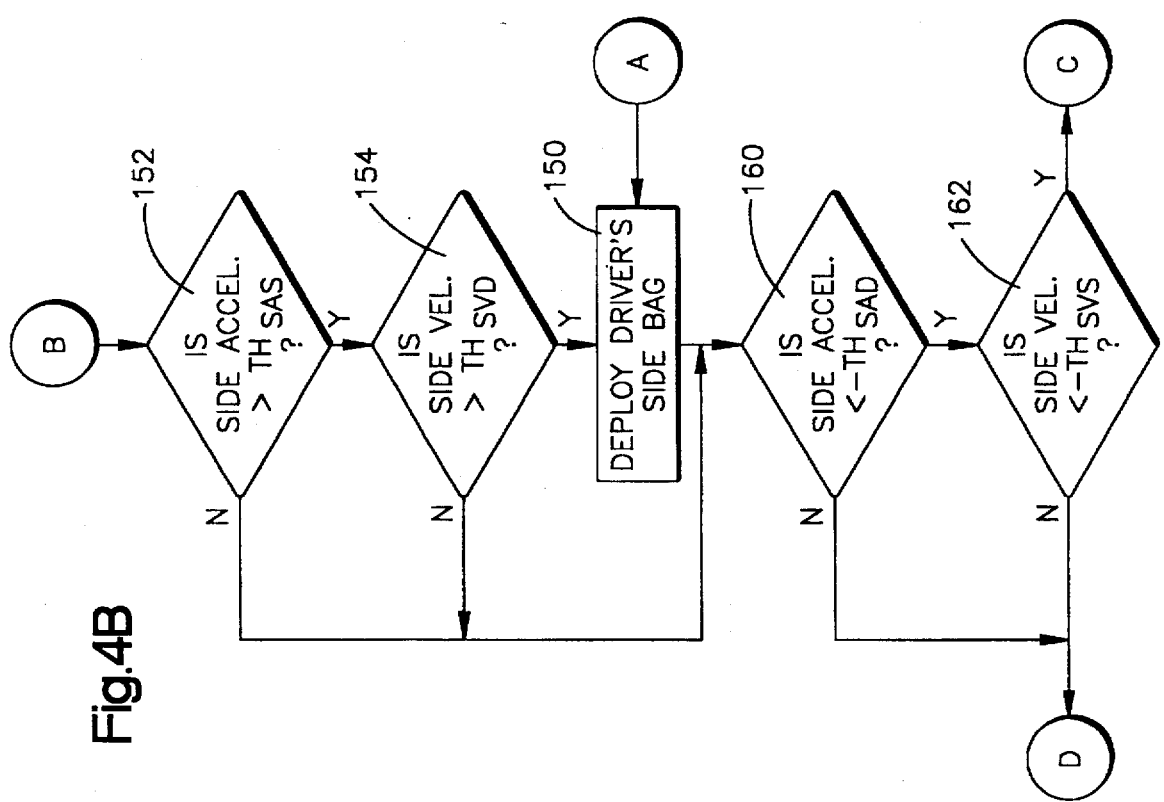

Referring to FIGS. 4A–4C, the control process 100, in accordance with the present invention, will be appreciated. The control process 100 begins at step 102 where internal memories of the controller 60 are reset, flags are set to initial conditions, etc. Such program initiation would typically occur when the vehicle is started. The process then proceeds to step 104 where the output of the front/rear accelerometer 40 is read. In an embodiment of the present invention in which the controller 60 is a microcomputer, the output of the accelerometers 40, 42, 44 would be connected to A/D (analog-to-digital) converter inputs of the microcomputer. In steps 106 and 108, the outputs from accelerometer A (42) and accelerometer B (44), respectively, are fetched by the controller 60.

The process then proceeds to step 110 where front metric values are calculated in response to the front accelerometer reading in step 104. As mentioned, these metric values can be calculated using any one of or combination of known metrics such as the average acceleration, acceleration squared, crash velocity, jerk, crash displacement, etc. Frontal crash velocity is determined for later use in the control process 100. In step 112, a first sideways metric value is determined in response to the sideways accelerometer reading in step 106. Recall that the accelerometer 42 is oriented so that a crash into the driver's door results in a positive value and a crash into the passenger's door results in a negative value. This first sideways metric value (responsive to the output of accelerometer 42) will for purposes of description be referred to as the moving average of acceleration, but may instead be one of or combination of known acceleration based metrics such as the square of acceleration, etc. In step 114, a second sideways metric value is determined in response to the sideways accelerometer reading in step 108. Recall that, preferably, the accelerometer 44 is oriented so that a crash into the passenger's door results in a positive value and a crash into the driver's door results in a negative value. The sign of the acceleration signal is changed (inverted) prior to any further processing. In this way, the signs of the accelerometer signals will be the same for crashes into the same side of the vehicle. The second sideways metric value (responsive to accelerometer 44) is a velocity based metric and may, e.g., be directly related to the integral of acceleration.

The process then proceeds to step 120 where a determination is made as to whether any of the determined front metric values ("FMS") calculated in step 110 is greater than associate front metric threshold values ("$TH_{FMS}$"). If the determination is affirmative, the process proceeds to step 122 where the front air bags 12, 14 are deployed. If other sensors 90, such as occupant presence and position sensors, are provided, those skilled in the art will appreciate that other inquiries would be made prior to actual deployment of the air bags 12, 14. For example, if a passenger is not present, the passenger's air bag would not be deployed. Also, air bag venting values would be controlled in response to occupant's sensed weight.

From step 122, the process proceeds to step 124 where the deployment of the side restraints (i.e., air bags 16, 18) are disabled for a predetermined time period "X". In accordance with one embodiment of the present invention, this time period is 200 milliseconds. This time delay insures that the side restraints will not be deployed as a result of some spurious sideways acceleration "seen" by sideways accelerometers 42, 44 during a frontal impact. The side restraints 16, 18 can thereafter be deployed as a result of a subsequent sideways acceleration that meets the side restraint deployment criteria of the present invention.

If the determination in step 120 is negative, the process makes a determination in step 130 whether the determined front velocity metric ("FVM") value determined in step 110 is greater than a side disable threshold value "$TH_{SDV}$". The purpose of this inquire is, again, to prevent deployment of the side restraints as a result of spurious side accelerations "seen" upon the occurrence of a frontal crash event. If the determination in step 130 is affirmative, the process proceeds to step 124.

From step 124, a determination is made in step 134 as to whether the time period "X" has elapsed. If the determination in step 134 is negative, the process loops back to step 104 to repeat the initial steps while the time period continues to time out. When the time period "X" times out, the process proceeds to step 136. From either an affirmative determination in step 134 or a negative determination in step 130, a determination is made in step 136 as to whether the side acceleration metric computed by function 86 in step 112 is greater than a side acceleration discrimination ("SAD") threshold value $TH_{SAD}$. If the determination in step 136 is affirmative, another determination is made in step 140 as to whether the side velocity metric value determined by function 88 in step 114 is greater than a side velocity safing ("SVS") threshold value $TH_{SVS}$. If the determination in step 140 is affirmative (meaning that both 136 and 140 are affirmative), the driver's side bag is deployed in step 150.

From a negative determination in either steps 136 or 140, the process proceeds to step 152 where a determination is made as to whether the side acceleration metric value computed by function 86 in step 112 is greater than a side acceleration safing ("SAS") threshold value $TH_{SAS}$. If the determination in step 152 is affirmative, another determination is made in step 154 as to whether the side velocity metric value determined by function 88 in step 114 is greater than a side velocity discrimination ("SVD") threshold value $TH_{SVD}$. If the determination in step 154 is affirmative (meaning that both 152 and 154 are affirmative), the driver's side air bag 16 is deployed in step 150. It should be appreciated that the driver's side air bag 16 is deployed from either affirmative determinations in steps 136 and 140 OR in steps 152 and 154. If there is not an affirmative determination in steps 136 and 140 OR in steps 152 and 154, the precess proceeds to step 160.

In step 160, a determination is made as to whether the side acceleration metric value computed by function 86 in step 112 is less than a negative side acceleration discrimination ("SAD") threshold value $-TH_{SAD}$. If the determination in step 160 is affirmative, another determination is made in step 162 as to whether the side velocity metric value determined by function 88 in step 114 is less than a negative side velocity safing ("SVS") threshold value $-TH_{SVS}$. If the determination in step 162 is affirmative (meaning that both 160 and 162 are affirmative), the passenger's side bag is deployed in step 170.

From a negative determination in either steps 160 or 162, the process proceeds to step 172 where a determination is made as to whether the side acceleration metric value computed by function 86 in step 112 is less than a negative side acceleration safing ("SAS") threshold value $-TH_{SAS}$. If the determination in step 172 is affirmative, another determination is made in step 174 as to whether the side velocity metric value determined by function 88 in step 114 is less than a negative side velocity discrimination ("SVD") threshold value $-TH_{SVD}$. If the determination in step 174 is affirmative (meaning that both 172 and 174 are affirmative), the passenger's side air bag 18 is deployed in step 170. It should be appreciated that the passenger's side air bag 18 is deployed from either affirmative determinations in steps 160 and 162 OR in steps 172 and 174. If there is not an affirmative determination in steps 160 and 162 OR in steps 172 and 174, the process loops back to step 104.

The threshold values used in the discrimination process are preferably determined using empirical crash data for a vehicle platform of interest. Crash data for both deployment and non-deployment crash events are used to select threshold values that yield the desired results. The threshold values can be either fixed or variable based on time, crash acceleration, crash velocity, or crash displacement. The positive and negative discrimination and safing threshold values may or may not be equal.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for controlling first and second actuatable side restraints in a vehicle, comprising:

first acceleration sensing means having an axis of sensitivity and mounted to the vehicle at a location for providing a first crash signal upon the occurrence of a sideways crash acceleration of the vehicle;

second acceleration sensing means having an axis of sensitivity and mounted at said location for providing a second crash signal upon the occurrence of said sideways crash acceleration of the vehicle;

means for determining a sideways crash acceleration value in response to said first crash signal;

means for determining a sideways crash velocity value in response to said second crash signal;

means for actuating one of said first and second actuatable side restraints when (i) said determined crash acceleration value is greater than an acceleration discrimination threshold value and said determined crash velocity value is greater than a velocity safing threshold value or (ii) said determined crash acceleration value is greater than an acceleration safing threshold value and said determined crash velocity value is greater than a velocity discrimination threshold value.

2. The apparatus of claim 1 further including means for actuating the other of said first and second side restraints when (i) said determined crash acceleration value is less than a negative acceleration discrimination threshold value and said determined crash velocity value is less than a negative velocity safing threshold value or (ii) said determined crash acceleration value is less than a negative acceleration safing threshold value and said determined crash velocity value is less than a negative velocity discrimination threshold value.

3. The apparatus of claim 1 further including means for mounting said first and second acceleration sensing means to a central location of said vehicle.

4. The apparatus of claim 3 wherein said mounting means mounts said first and second acceleration sensing means at the vehicle's transmission tunnel where vehicle cross members intersect the transmission tunnel.

5. The apparatus of claim 1 wherein said first and second acceleration sensing means have their associated axis of sensitivity parallel with a transverse axis of the vehicle and oriented so as to provide acceleration signals having opposite signs for the same crash event.

6. An apparatus for controlling first and second actuatable side restraints and a front restraint in a vehicle, comprising:

first acceleration sensing means having an axis of sensitivity and mounted to the vehicle at a location for providing a first crash signal upon the occurrence of a sideways crash acceleration of the vehicle;

second acceleration sensing means having an axis of sensitivity and mounted at said location for providing a second crash signal upon the occurrence of said sideways crash acceleration of the vehicle;

third acceleration sensing means having an axis of sensitivity and mounted to the vehicle at said location for providing a third crash signal upon the occurrence of a front-to-rear crash acceleration of the vehicle;

means for controlling actuation of said first and second side restraints in response to said first and second crash signals;

means for controlling actuation of said front restraint in response to said third crash signal; and means for disabling actuation of said side restraints when said third crash signal indicates a frontal crash is occurring.

7. The apparatus of claim 6 wherein said means for disabling actuation of said side restraints includes means to maintain disablement of said side restraints for a predetermined time period after said third crash signal indicates a frontal crash condition.

8. A method for controlling first and second actuatable side restraints in a vehicle, said method comprising the steps of:

mounting a first accelerometer having an axis of sensitivity to the vehicle at a location so as to provide a first crash signal upon the occurrence of a sideways crash acceleration of the vehicle;

mounting a second accelerometer having an axis of sensitivity at said location so as to provide a second crash signal upon the occurrence of said sideways crash acceleration of the vehicle;

determining a sideways crash acceleration value in response to said first crash signal;

determining a sideways crash velocity value in response to said second crash signal;

actuating one of said first and second actuatable side restraints when (i) said determined crash acceleration value is greater than an acceleration discrimination threshold value and said determined crash velocity value is greater than a velocity safing threshold value or (ii) said determined crash acceleration value is greater than an acceleration safing threshold value and said determined crash velocity value is greater than a velocity discrimination threshold value.

9. A method for controlling first and second actuatable side restraints and a front restraint in a vehicle, said method comprising the steps of:

mounting a first accelerometer having an axis of sensitivity to the vehicle at a location so as to provide a first crash signal upon the occurrence of a sideways crash acceleration of the vehicle;

mounting a second accelerometer having an axis of sensitivity at said location so as to provide a second crash signal upon the occurrence of said sideways crash acceleration of the vehicle;

mounting a third accelerometer having an axis of sensitivity to the vehicle at said location so as to provide a third crash signal upon the occurrence of a front-to-rear crash acceleration of the vehicle;

controlling actuation of said first and second side restraints in response to said first and second crash signals;

controlling actuation of said front restraint in response to said third crash signal; and disabling actuation of said side restraints when said third crash signal indicates a frontal crash is occurring.

10. An apparatus for controlling front and side restraints in a vehicle, comprising:

first acceleration sensing means having an axis of sensitivity and mounted to the vehicle at a location for providing a first crash signal indicative of lateral acceleration in response to an occurrence of a side crash of the vehicle;

second acceleration sensing means having an axis of sensitivity and mounted at said location for providing a second crash signal indicative of fore-aft acceleration in response to an occurrence of a frontal crash of the vehicle;

means for determining a sideways crash value in response to said first crash signal;

means for actuating said side restraint in response to said sideways crash value exceeding a predetermined deployment threshold value;

means for determining a frontal crash value in response to said second crash signal;

means for actuating said front restraint in response to said frontal crash value exceeding a predetermined deployment threshold value; and means for disabling actuation of said side restraint in response to said frontal crash value exceeding a predetermined non-deployment threshold value.

11. The apparatus of claim 10 wherein said means for disabling actuation of said side restraint includes means to maintain disablement of said side restraint for a predetermined time period after said second crash signal indicates a frontal crash condition.

12. A method for controlling front and side restraints in a vehicle, said method comprising the steps of:

mounting a first accelerometer having an axis of sensitivity to the vehicle at a location so as to provide a first crash signal indicative of lateral acceleration in response to an occurrence of a side crash of the vehicle;

mounting a second accelerometer having an axis of sensitivity at said location so as to provide a second crash signal indicative of fore-aft acceleration in response to an occurrence of a frontal crash of the vehicle;

determining a sideways crash value in response to said first crash signal;

actuating said side restraint in response to said determined sideways crash value exceeding a predetermined deployment threshold value;

determining a frontal crash value in response to said second crash signal;

actuating said front restraint in response to said determined frontal crash value exceeding a predetermined deployment threshold value; and disabling actuation of said side restraint in response to said frontal crash value exceeding a predetermined non-deployment threshold value.

* * * * *